United States Patent
Machl et al.

(10) Patent No.: US 8,487,185 B2
(45) Date of Patent: Jul. 16, 2013

(54) CABLE LAYER OF MODIFIED SOFT POLYPROPYLENE

(75) Inventors: Doris Machl, Mettmach (AT); Tung Pham, Linz (AT); Katja Klimke, Linz (AT)

(73) Assignee: Borealis Technology Oy, Porvoo (FI)

( * ) Notice: Subject to any disclaimer, the term of this patent is extended or adjusted under 35 U.S.C. 154(b) by 358 days.

(21) Appl. No.: 12/735,155

(22) PCT Filed: Dec. 12, 2008

(86) PCT No.: PCT/EP2008/067396
§ 371 (c)(1),
(2), (4) Date: Jul. 19, 2010

(87) PCT Pub. No.: WO2009/077444
PCT Pub. Date: Jun. 25, 2009

(65) Prior Publication Data
US 2010/0282492 A1    Nov. 11, 2010

(30) Foreign Application Priority Data
Dec. 18, 2007    (EP) ..................................... 07123518

(51) Int. Cl.
*H01B 7/00*    (2006.01)

(52) U.S. Cl.
USPC ................................ 174/110 R; 174/110 SR

(58) Field of Classification Search
USPC ............... 174/110 R, 110 N–110 PM, 113 R, 174/120 R, 120 SC, 121 R
See application file for complete search history.

(56) References Cited

U.S. PATENT DOCUMENTS

| | | | | |
|---|---|---|---|---|
| 4,323,534 A | * | 4/1982 | DesMarais | 264/211.14 |
| 6,013,734 A | * | 1/2000 | Berta | 525/221 |
| 6,077,907 A | | 6/2000 | Raetzsch et al. | |
| 6,177,515 B1 | * | 1/2001 | Smith et al. | 525/70 |
| 6,407,168 B1 | * | 6/2002 | Sugita et al. | 525/88 |
| 6,495,760 B1 | | 12/2002 | Castellani et al. | |
| 2005/0020755 A1 | * | 1/2005 | Berta | 524/487 |
| 2005/0131154 A1 | | 6/2005 | Cai et al. | |

FOREIGN PATENT DOCUMENTS

| EP | 1 295 910 | 3/2003 |
|---|---|---|
| EP | 1 391 482 | 2/2004 |

(Continued)

OTHER PUBLICATIONS

JC. Randall; JMS—Rev. Macromol. Chem. Phys.; C29(2&3); 1989; pp. 201-317.

(Continued)

*Primary Examiner* — William H Mayo, III
(74) *Attorney, Agent, or Firm* — Warn Partners, P.C.

(57) ABSTRACT

Cable layer including a propylene polymer composition including (a) a propylene polymer (b) an elastomeric copolymer of propylene and at least one comonomer selected from the group consisting of ethylene, C4 α-olefin, C5 α-olefin, C6 α-olefin, C7 α-olefin, C8 α-olefin, C9 α-olefin and C10 α-olefin, and (c) units derived from at least bifunctionally unsaturated monomer(s) and/or at least multifunctionally unsaturated low molecular weight polymer(s), the units being linked to the propylene polymer and/or the elastometric copolymer wherein the gel content of the propylene polymer composition determined as the amount of polymer insoluble in boiling xylene is not more than 1 wt %.

35 Claims, 5 Drawing Sheets

Strain hardening behaviour of CE 1

FOREIGN PATENT DOCUMENTS

| | | |
|---|---|---|
| EP | 0 893 801 | 4/2004 |
| EP | 1 619 217 | 1/2006 |
| EP | 1 717 269 | 11/2006 |
| EP | 1 834 987 | 9/2007 |
| EP | 1 847 565 | 10/2007 |
| WO | WO 2005/055250 | 6/2005 |

OTHER PUBLICATIONS

Sentmanat, M. et al.; "Measuring the transient extensional rheology of polyethylene melts using the SER universal testing platform"; 2005; pp. 585-606; The Society of Rheology, Inc.; J. Rheol. 49.

* cited by examiner

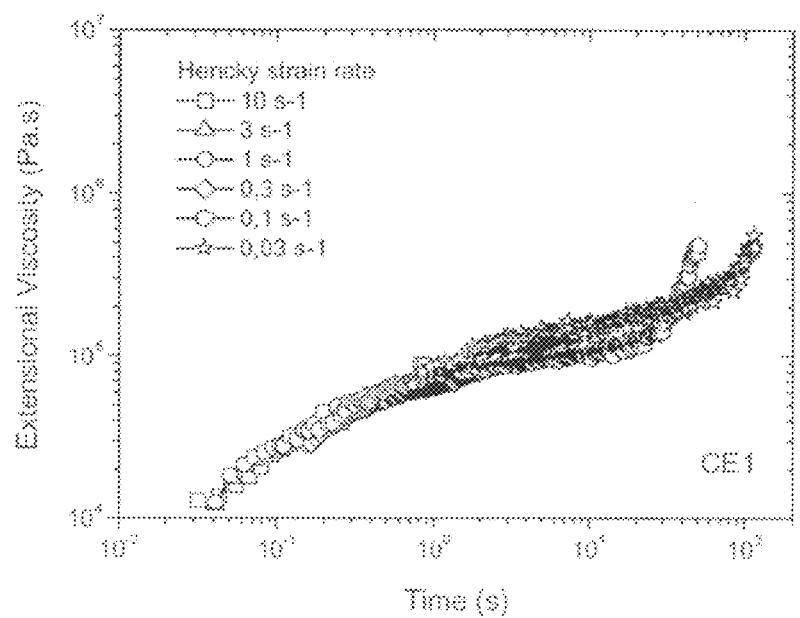
Figure 1: Strain hardening behaviour of CE 1

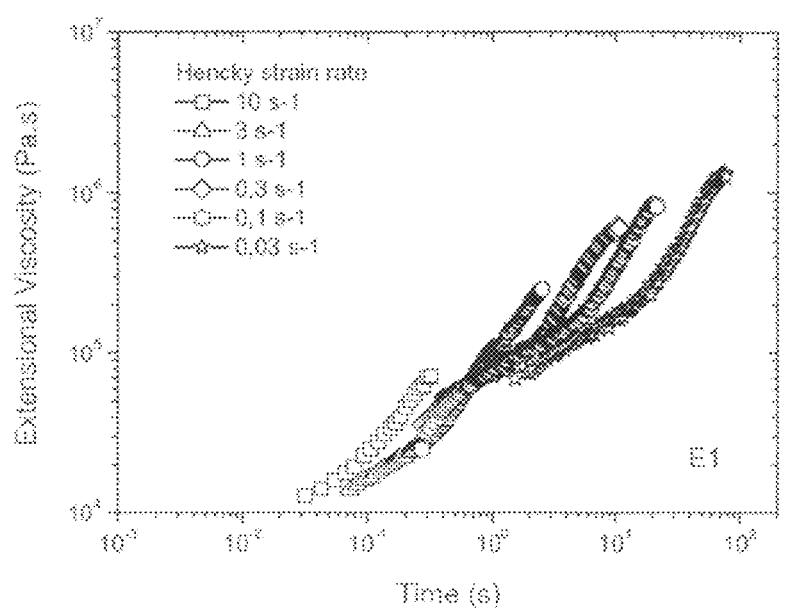
Figure 2: Strain hardening behaviour of E 1

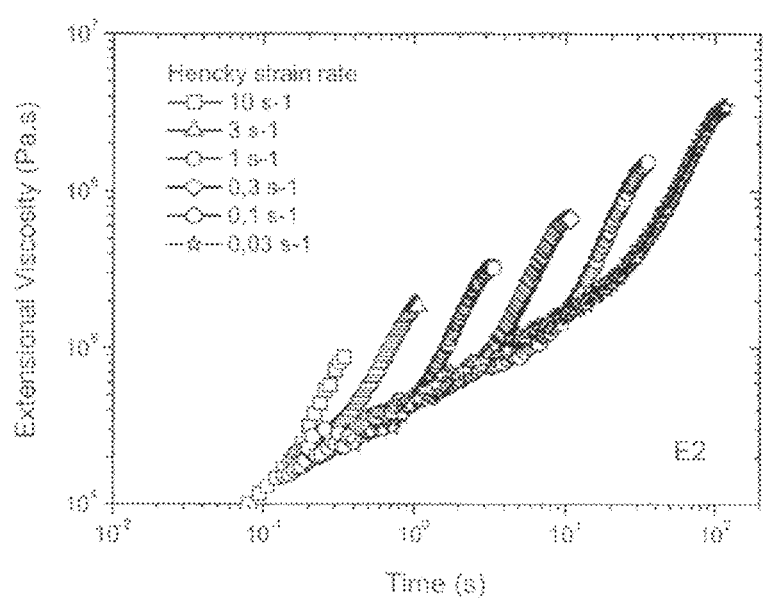
Figure 3: Strain hardening behaviour of E 2

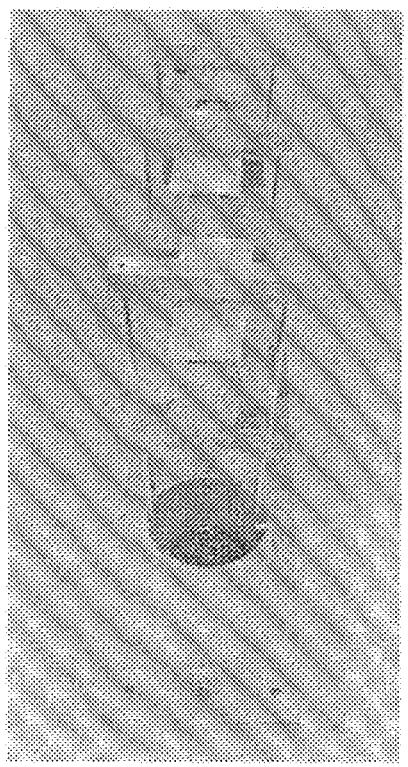
Figure 4: Test rig for heat deformation.

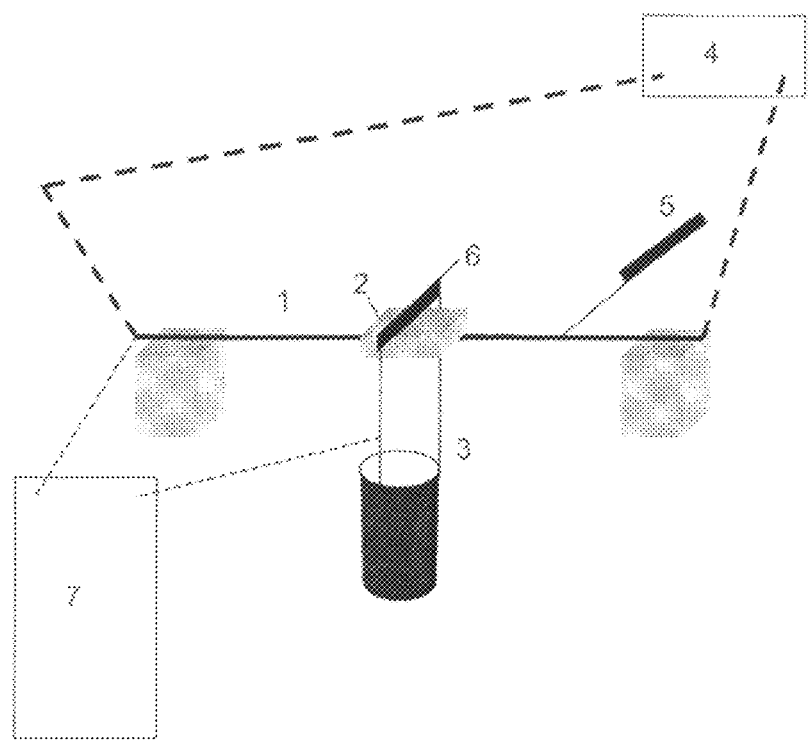
Figure 5: Hot wire deformation test equipment

CABLE LAYER OF MODIFIED SOFT POLYPROPYLENE

This application is a National Stage of International Application No. PCT/EP2008/067396, filed Dec. 12, 2008. This application claims priority to European Patent Application No. 07123518.8 filed on Dec. 18, 2007. The disclosures of the above applications are incorporated herein by reference.

The present invention relates to a new cable layer of polypropylene as well as to its use and to cables comprising said new cable layer.

Today, polyethylene is used as the material of choice for the insulation and semiconductive layers in power cables due to the ease of processing and the beneficial electrical properties. In order to assure good operating properties at the required operating temperature (90° C.) the polymers are crosslinked. A drawback of such crosslinked polyethylene materials is the remaining crystalline fraction of the polyethylene which melts at about 110° C. This means that at the emergency temperature (~135° C.) the material might create some problems.

Nowadays attempts are undertaken to replace known cable layers based on polyethylene by cable layers based on polypropylene. Various polypropylene types have been suggested tailored for individual purposes.

For instance EP 1 619 217 A1 provides a cable layer of a heterophasic propylene polymer with good results in view softness and toughness, even though the toughness at low temperatures could be still improved. Also the polymer cannot be extruded at high line speeds, which however is appreciated under commercial aspects.

EP 0 893 801 A1 discloses propylene polymer components suitable as insulation sheet material. It particularly discloses a composition of a crystalline propylene homopolymer or copolymer mixed with a copolymer of ethylene with an α-olefin having a low density and a high structural uniformity, in particular having a highly homogeneous distribution of the α-olefin between the polymer molecules. However, EP 0 893 801 A1 does not disclose a possibility having an insulation layer suitable for high temperature operation conditions, simultaneously having very good mechanical and process properties.

Thus there is still the need for new cable layers based on polypropylene. There is in particular the need for cable layers with a very high toughness at low temperatures paired with a high temperature performance.

Thus the object of the present invention is to provide a cable layer with excellent temperature performance by keeping the mechanical properties on an outstanding level. Accordingly it is sought for a cable layer with excellent temperature performance and high toughness in particular at low temperatures. Additionally it is appreciated that the cable layer is featured by high flexibility in terms of tensile modulus and/or strain at break. Moreover the new cable layers shall be obtained by high output rates, i.e. the thermoplastic extrusion speed to assess the cable application must be satisfactorily high.

BRIEF DESCRIPTION OF THE SEVERAL VIEWS OF THE DRAWINGS

FIG. 1 is a graph depicting strain hardening behaviors of CE1;
FIG. 2 is a graph depicting strain hardening behavior of E1;
FIG. 3 is a graph depicting strain hardening behavior of E2;
FIG. 4 illustrates a test rig for heat deformation; and
FIG. 5 illustrates hot wire deformation test equipment.

The finding of the present invention is to provide a cable layer based on a heterophasic propylene copolymer with rather high ethylene content wherein the copolymer has been chemically modified by at least bifunctionally unsaturated compounds.

Thus the present invention provides a cable layer comprising a propylene polymer composition comprising
(a) a propylene polymer (A)
(b) an elastomeric copolymer (B) of propylene and at least one comonomer selected from the group consisting of ethylene, C4 α-olefin, C5 α-olefin, C6 α-olefin, C7 α-olefin, C8 α-olefin, C9 α-olefin and C10 α-olefin, and
(c) units (C) derived from at least bifunctionally unsaturated monomer(s) (C') and/or at least multifunctionally unsaturated low molecular weight polymer(s) (C").

Preferably the units (C) are chemically bound bridging units, i.e. units linked to the propylene polymer (A) and/or the elastomeric copolymer (B). Even more preferred the bifunctionally unsaturated monomer(s) (C') and/or multifunctionally unsaturated low molecular weight polymer(s) (C") are linked to the propylene polymer (A) and/or elastomeric copolymer (B) preferably supported by thermally decomposing free radical-forming agents.

Alternatively the cable layer of the present invention can be defined by a cable layer comprising a propylene polymer composition comprising
(a) a propylene polymer (A)
(b) an elastomeric copolymer (B) of propylene and at least one comonomer selected from the group consisting of ethylene, C4 α-olefin, C5 α-olefin, C6 α-olefin, C7 α-olefin, C8 α-olefin, C9 α-olefin and C10 α-olefin,
wherein said composition is chemically modified by (at least) bifunctionally unsaturated monomer(s) (C') and/or (at least) multifunctionally unsaturated low molecular weight polymer(s) (C").

In a preferred embodiment of the first and second alternative the composition is chemically modified by bifunctionally unsaturated monomer(s) (C') and/or multifunctionally unsaturated low molecular weight polymer(s) (C") only. Of course preferably supported by thermally decomposing free radical-forming agents as defined for instance in the present invention. Moreover it is appreciated that the gel content of the cable layer and/or the propylene polymer composition, determined as the amount of polymer insoluble in boiling xylene, is rather low, i.e. equal or below 3.0 wt.-%, preferably equal or below 2.0 wt.-%, like equal or below 1.0 wt.-%.

Preferably the chemically modification as described by the first and second alternative is achieved by the reaction of the propylene polymer (A) and/or the elastomeric copolymer (B) with the bifunctionally unsaturated monomer(s) (C') and/or multifunctionally unsaturated low molecular weight polymer(s) (C") preferably supported by thermally decomposing free radical-forming agents. More preferably (at least) the bifunctionally unsaturated monomer(s) (C') and/or (at least) the multifunctionally unsaturated low molecular weight polymer(s) (C") lead(s) to chemically bound bridging units, i.e. to units linked to the propylene polymer (A) and/or the elastomeric copolymer (B).

Thus the present invention is especially directed to a cable layer comprising a propylene polymer composition comprising
(a) a propylene polymer (A)
(b) an elastomeric copolymer (B) of propylene and at least one comonomer selected from the group consisting of ethylene, C4 α-olefin, C5 α-olefin, C6 α-olefin, C7 α-olefin, C8 α-olefin, C9 α-olefin and C10 α-olefin, and (c) units (C) derived from at least bifunctionally unsaturated monomer(s) (C') and/or at least multifunctionally unsaturated low molecular weight polymer(s) (C"), the units (C) being linked to the propylene polymer (A) and/or the elastomeric copolymer (B), wherein further the gel content of the propylene polymer composition determined as the amount of polymer insoluble in boiling xylene is equal or below 3.0 wt.-%, preferably equal or below 2.0 wt.-%, like not more than 1 wt.-%.

Surprisingly it has been found out that the cable layer of both embodiments expressed above has superior properties compared with products known in the art (see table 2-4). For instance the cable layer is featured by an outstanding toughness at low temperatures compared to commercial counterparts. On the other hand this improvement has been not paid with loss flexibility in terms of tensile modulus and strain at break. Moreover the temperature performance of the inventive cable layers is significantly improved compared to the products being state of the art (compare FIG. 2 or 3). Finally the cable layers can be produced at high speed lines which must be seen as a further advantage. Overall it is noted that the new cable layer has better properties in any aspects compared to standard products.

The further features mentioned below apply to both embodiments as defined above. Preferably the propylene polymer composition of the cable layer and/or the cable layer does (do) not comprise further polymers, i.e. propylene polymer (A), the elastomeric copolymer (B) and optionally the multifunctionally unsaturated low molecular weight polymers (C") are the only polymers within the propylene polymer composition and/or the cable layer.

To obtain especially good results the components may be present in specific amounts. Thus it is preferred that the propylene polymer composition according to the instant invention comprises (a) at least 40.0 wt.-%, preferably 50.0 to 80.0 wt.-%, more preferably 55 to 78.0 wt.-%, yet more preferably 60.0 to 75.0 wt.-% of propylene polymer (A) based on the total amount of the propylene polymer (A) and the elastomeric copolymer (B), and (b) at least 20.0 wt.-%, preferably 20.0 to 50.0 wt.-%, more preferably 22.0 to 45.0 wt.-%, yet more preferably 25.0 to 40.0 wt.-% of the elastomeric copolymer (B) based on the total amount of the propylene polymer (A) and the elastomeric copolymer (B).

As stated above the propylene polymer composition is modified, wherein the modification is preferably accomplished by (at least) bifunctionally unsaturated monomer(s) (C') and/or (at least) multifunctionally unsaturated low molecular weight polymer(s) (C"). It is even more preferred that said monomer(s) (C') and/or polymer(s) (C") react to chemically bound bridging unit(s) (C), i.e. to units linked to the propylene polymer (A) and/or the elastomeric copolymer (B). A preferred amount of the bifunctionally unsaturated monomer(s) (C') and/or multifunctionally unsaturated low molecular weight polymer(s) (C") in the present propylene polymer composition is at least 0.1 wt.-%, i.e. in the range of 0.1 to 10.0 wt.-%, more preferably in the range of 0.1 to 5.0 wt.-%, yet more preferably in the range of 0.1 to 3.0 wt.-%, based on the total amount of said composition, preferably based on the sum of the propylene polymer (A), the elastomeric copolymer (B) and the bifunctionally unsaturated monomer(s) (C') and/or the multifunctionally unsaturated low molecular weight polymer(s) (C").

Thus the propylene polymer (A) and the elastomeric copolymer (B) together constitute preferably at least 90 wt.-%, i.e. preferably 90.0 to 99.9 wt.-%, more preferably 95.0 to 99.9 wt.-%, still more preferably 97.0 to 99.9 wt.-% of the propylene polymer composition, more preferably based on the sum of the propylene polymer (A), the elastomeric copolymer (C) and the bifunctionally unsaturated monomer(s) (C') and/or the multifunctionally unsaturated low molecular weight polymer(s) (C") together.

Thus it is preferred that the propylene polymer composition according to the instant invention comprises (a) at least 40.0 wt.-%, preferably 40.0 to 79.9 wt.-%, more preferably 50.0 to 77.9 wt.-%, yet more preferably 57.0 to 74.9 wt.-% of propylene polymer (A), (b) at least 20.0 wt.-%, preferably 20.0 to 50.0 wt.-%, more preferably 22.0 to 45.0 wt.-%, yet more preferably 25.0 to 40.0 wt.-% of the elastomeric copolymer (B), and (c) at least 0.1 wt.-%, preferably 0.1 to 10.0 wt.-%, more preferably 0.1 to 5.0 wt.-%, yet more preferably 0.1 to 3.0 wt.-% of the bifunctionally unsaturated monomer(s) (C') and/or the multifunctionally unsaturated low molecular weight polymer(s) (C")

based on the propylene polymer composition, more preferably based on the sum of the propylene polymer (A), the elastomeric copolymer (B) and the bifunctionally unsaturated monomer(s) (C') and/or the multifunctionally unsaturated low molecular weight polymer(s) (C") together.

The thermally decomposing free radical-forming agent, if used, is preferably in the range of 0.05 to 3.00 wt.-% based on the propylene polymer composition, preferably based on the sum of the thermally decomposing free radical-forming agent, the propylene polymer (A), the elastomeric copolymer (B), the thermally decomposing free radical-forming agent and the bifunctionally unsaturated monomer(s) (C') and/or the multifunctionally unsaturated low molecular weight polymer(s) (C").

It is preferred that the polypropylene (A) and the elastomeric copolymer (B) are an intimate mixture, i.e. a reactor blend, preferably a reactor blend as defined in further detail below.

Thus the propylene polymer composition of the cable layer comprises a heterophasic propylene copolymer (D) comprising (a) the propylene polymer (A) as a matrix, and (b) the elastomeric copolymer (B) as an amorphous part dispersed in said matrix, wherein the propylene polymer composition, i.e. the heterophasic propylene copolymer (D), is modified. Even more preferred said composition, i.e. the heterophasic propylene copolymer (D), is modified due to unit(s) (C) derived from (at least) bifunctionally unsaturated monomer(s) (C') and/or (at least) multifunctionally unsaturated low molecular weight polymer(s) (C"). In particular said composition, i.e. the heterophasic propylene copolymer (D), is modified due to chemically bound bridging unit(s) (C) derived from (at least) bifunctionally unsaturated monomer(s) (C') and/or (at least) multifunctionally unsaturated low molecular weight polymer(s) (C") wherein said units (C) are preferably linked to propylene polymer (A) and/or the elastomeric copolymer (B).

As stated above the modification can be supported by a thermally decomposing free radical-forming agent, preferably in the amount as given above.

The heterophasic propylene copolymer (D) is obtained by carrying out an at least two stage process resulting in a multiphase structure with a propylene polymer matrix (A) and inclusions therein comprising the elastomeric copolymer (B) as a part of the amorphous phase. The exact method to produce such a heterophasic propylene copolymer (D) is defined in detail below.

One mandatory requirement of the present invention is the presence of propylene polymer (A) in the propylene polymer composition of the cable layer. The propylene polymer (A) can be a propylene homopolymer (A'), a propylene copolymer (A") or mixtures thereof.

However it is preferred that the propylene polymer (A) is a propylene copolymer (A").

Where the propylene polymer (A) comprises two or more different propylene polymers these may be polymers with different monomer make up and/or with different molecular weight distributions. These components may have identical or differing monomer compositions and tacticities.

The propylene polymer (A), in particular in case the propylene polymer (A) is the matrix of the heterophasic propylene copolymer (D), may be produced in a polymerization stage effected in one or more polymerization reactors. Desirably the propylene polymer (A), in particular in case the propylene polymer (A) is the matrix of the heterophasic propylene copolymer (D), comprising two or more different propylene polymers may be produced by carrying out polymerization in two or more different polymerisation reactors (e.g. bulk and/or gas phase reactors; as bulk reactors, loop reactors are preferred) whereby to generate polymers of the different desired molecular weight distributions or monomer make ups in the different polymerization reactors.

As stated above the propylene polymer (A), in particular in case the propylene polymer (A) is the matrix of the heterophasic propylene copolymer (D), is preferably a propylene homopolymer (A') or propylene copolymer (A") or a mixture thereof. Where it comprises a copolymer (A"), the comonomers may include monomers copolymerizable with propylene, for example comonomers such as ethylene and C4 to C20 α-olefins, in particular ethylene and C4 to C10 α-olefins, e.g. ethylene, C4 α-olefin, C5 α-olefin, C6 α-olefin, C7 α-olefin, C8 α-olefin, C9 α-olefin and C10 α-olefin. Suitable examples thereof are 1-butene, 1-pentene, 1-hexene, 1-heptene, 1-octene, 1-nonene and 1-decene, whereby 1-butene and 1-hexene are preferred. It is in particular preferred that the comonomer is ethylene. Preferably, where a copolymer component is present this will be a (relatively high molecular weight) random copolymer. The comonomer content, preferably ethylene content, is preferably relatively low, i.e. not more than 9.0 wt.-%, more preferably 2.5 to 8.0 wt.-%, still more preferably 3.0 to 7.5 wt.-%, yet more preferably 3.5 to 7.0 wt.-%.

Preferably the propylene polymer (A), in particular in case the propylene polymer (A) is the matrix of the heterophasic propylene copolymer (D), is unimodal.

It is in particular preferred that the propylene polymer (A), in particular in case the propylene polymer (A) is the matrix of the heterophasic propylene copolymer (D), is a (random) propylene copolymer (A") produced in one reactor, preferably in a loop reactor, and thus of unimodal character. Particularly the ethylene is the only comonomer in such a propylene copolymer (A").

However the propylene polymer (A), in particular in case the propylene polymer (A) is the matrix of the heterophasic propylene copolymer (D), can be also multimodal, like bimodal.

"Multimodal" or "multimodal distribution" describes a frequency distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen as a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

Such a multimodal, preferably bimodal, propylene polymer (A), in particular the propylene polymer (A) as the matrix of the heterophasic propylene copolymer (D), may comprise a propylene homopolymer (A') and/or a propylene copolymer (A"). Preferably the multimodal, more preferably bimodal, propylene polymer (A), in particular as the matrix of the heterophasic propylene copolymer (D), comprises a propylene copolymer (A") only.

Such a bimodal propylene copolymer has an ethylene content of not more than 9.0 wt.-%, more preferably 2.5 to 8.0 wt.-%, still more preferably 3.0 to 7.5 wt.-%, yet more preferably 3.5 to 7.0 wt.-%. Particularly the ethylene is the only comonomer in the bimodal propylene copolymer (A").

The production of polymers having the desired properties for propylene polymer (A), in particular the propylene polymer (A) as the matrix of the heterophasic propylene copolymer (D), may be achieved using techniques well known to those skilled in the art, e.g. by appropriate selection of catalyst systems (e.g. Ziegler Natta catalysts or metallocene or other single site catalysts), comonomers, polymerization reactor type and polymerization process conditions. Particularly the propylene polymer (A), in particular the propylene polymer (A) as the matrix of the heterophasic propylene copolymer (D), is produced in a polymerization process using a supported Ziegler Natta catalyst system (especially a high yield Ziegler Natta system containing Ti, Cl, Mg and Al). Metallocene catalysts may also be used.

Further and preferably the propylene polymer (A), in particular the propylene polymer (A) as the matrix of the heterophasic propylene copolymer (D), has a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the propylene polymer (A) has an $MFR_2$ (230° C.) below 5.0 g/10 min, more preferred below 3.0 g/10 min, yet more preferred below 2.0 g/10 min. Thus it is appreciated that the $MFR_2$ (230° C.) of the propylene polymer (A) is in the range of 0.05 to 5.00 g/10 min, more preferably of 0.50 to 3.00 g/10 min, still more preferably of 0.80 to 2.00 g/10 min. The ranges given apply to a polypropylene (A) which is not modified due to the bifunctionally unsaturated monomers (C') and/or the multifunctionally unsaturated low molecular weight polymers (C") as defined in the instant invention.

The second requirement of both embodiments of the instant invention is the presence of the elastomeric copolymer (B) in the propylene polymer composition. The elastomeric copolymer (B) comprises, preferably consists of, propylene and at least one α-olefin comonomer selected form the group consisting of ethylene, C4 α-olefin, C5 α-olefin, C6 α-olefin, C7 α-olefin, C8 α-olefin, C9 α-olefin and C10 α-olefin. Suitable examples for the comonomers are in particular ethylene, 1-butene, 1-pentene, 1-hexene, 1-heptene and 1-octene. Preferably the elastomeric copolymer (B) comprises at least propylene and ethylene and may comprise a further α-olefin as defined in this paragraph. However it is in particular preferred that ethylene is the only comonomer. Thus an ethylene-propylene rubber (EPR) as elastomeric copolymer (B) is most preferred.

The comonomer content, preferably the ethylene content, in the elastomeric copolymer (B) is desirably relatively high, i.e. at least 15.0 wt.-% and/or up to 48.0 wt.-%, preferably 15.0 to 45.0 wt.-%, more preferably 20.0 to 43.0 wt.-%. Preferably the elastomeric copolymer (B) is an ethylene-propylene rubber (EPR), in particular with an ethylene content as defined in this paragraph.

Moreover the propylene polymer composition, in particular the heterophasic propylene copolymer (D), is characterized by an even dispersion of the elastomeric copolymer (B) within the propylene polymer (A). Such a high dispersion is only accomplished in case the propylene polymer (A) and the elastomeric copolymer (B) have similar viscosity behaviour. Accordingly it is appreciated that the elastomeric copolymer (B) has a rather low intrinsic viscosity, i.e. a rather low intrinsic viscosity determined as the intrinsic viscosity of the acetone precipitated fraction of the xylene soluble fraction, IV of AM. Thus the elastomeric copolymer (B) has an intrinsic viscosity of the acetone precipitated fraction of the xylene soluble fraction, IV of AM preferably of not more than 4.0 dl/g. More preferably the intrinsic viscosity is in the range of 1.0 to 4.0 dl/g, still more preferred in the range of 1.5 to 3.5 dl/g.

As with the propylene polymer (A), the elastomeric copolymer (B) may be produced by conventional gas phase α-olefin polymerization techniques; however it is preferably produced using a supported catalyst system, e.g. a Ziegler Natta catalyst system or a metallocene catalyst system. Even more preferred the elastomeric copolymer (B) is produced in a gas phase reactor.

As stated above the elastomeric copolymer (B) together with the propylene polymer (A) form preferably a heterophasic propylene copolymer (D). In such a case the elastomeric copolymer (B) may be blended with the propylene polymer (A) as the matrix polymer. However, more desirably it is produced by performing a second and/or third polymerization stage in the presence of particles of propylene polymer (A), e.g. as a second and/or third polymerization stage of a multi-stage polymerization. Preferably the combination of the polypropylene (A) and elastomeric copolymer (B) is produced in a at least two stage polymerization using two, three or more polymerization reactors, more preferably using bulk and gas phase reactor(s) (especially fluidized bed gas phase reactor(s)) especially preferably using a loop reactor followed by two gas phase reactors or by a loop and a gas phase reactor, wherein the latter is preferred. In such a procedure, the catalyst system used may be varied between stages but is preferably the same for all stages. Especially preferably a prepolymerized heterogeneous (i.e. supported) catalyst is used.

While the catalyst may be a metallocene, it is preferred to use Ziegler Natta catalysts, e.g. an inorganic halide (e.g. $MgCl_2$) supported titanium catalyst, together with an aluminium alkyl (e.g. triethylaluminium) cocatalyst. Silanes, e.g. dicyclopentanedimethoxysilane (DCPDMS) or cyclohexylmethyldimethoxysilane (CHMDMS), may be used as external donors. Such catalyst systems are described in EP 0 491 566 A1, the contents whereof are hereby incorporated by reference.

In the following the inventive propylene polymer composition according to the first and second embodiment is further specified by the combination of the propylene polymer (A) and the elastomeric copolymer (B). This applies in particular for the cases in which the polypropylene (A) and the elastomeric copolymer (B) form a heterophasic propylene copolymer (D).

Accordingly it is preferred that the propylene polymer composition, more preferably of the mixture of the polypropylene (A) and the elastomeric copolymer (B), i.e. the heterophasic propylene copolymer (D), has a comonomer content, preferably ethylene content, of at least 7.0 wt.-%, more preferably of more than 10.0 wt.-%, yet more preferably more than 12.0 wt.-%. On the other hand the comonomer content should be not too high, i.e. not higher than 30.0 wt.-%, preferably not higher than 25.0 wt.-%. Thus a preferred range for the comonomer content for the propylene polymer composition, more preferably of the mixture of the polypropylene (A) and the elastomeric copolymer (B), i.e. the heterophasic propylene copolymer (D), is 7.0 to 30.0 wt.-%, more preferably 10.0 to 25.0 wt.-%.

Moreover it is appreciated that the $MFR_2$ (230° C.) of the propylene polymer composition is relatively low, i.e. of not more than 5.00 g/10 min. Thus the $MFR_2$ (230° C.) of the propylene polymer composition is preferably in a range of 0.05 to 4.00 g/10 min, more preferably of 0.30 to 2.50 g/10 min, still more preferably of 0.40 to 1.00 g/10 min. The ranges given apply to a non-modified state due to the bifunctionally unsaturated monomers (C') and/or the multifunctionally unsaturated low molecular weight polymers (C") as defined in the instant invention.

But not only the total propylene polymer composition in an unmodified state shall have a rather low $MFR_2$ (230° C.) but also the mixture of the polypropylene (A) and the elastomeric copolymer (B), i.e. the heterophasic propylene copolymer (D). Accordingly it is appreciated that the $MFR_2$ (230° C.) of the mixture of the polypropylene (A) and the elastomeric copolymer (B), i.e. the heterophasic propylene copolymer (D), is relatively low, i.e. of not more than 5.00 g/10 min. Thus the $MFR_2$ (230° C.) of the mixture of the polypropylene (A) and the elastomeric copolymer (B), i.e. the heterophasic propylene copolymer (D), is preferably in a range of 0.05 to 4.00 g/10 min, more preferably of 0.30 to 2.50 g/10 min, still more preferably of 0.40 to 1.00 g/10 min. The ranges given apply to a non-modified state due to the bifunctionally unsaturated monomers (C') and/or the multifunctionally unsaturated low molecular weight polymers (C") as defined in the instant invention.

Finally the present invention requires that the propylene polymer composition of the inventive cable layer is modified, i.e. chemically modified. Such a modification is in particular necessary to accomplish the requirement of the invention that the cable layer can be produced at high line speeds. Thus—as stated above—the propylene polymer composition of the inventive cable layer is inter alia defined by the presence of bifunctionally unsaturated monomers (C') and/or the multifunctionally unsaturated low molecular weight polymers (C"). Without be bonded on this theory the modification may be a chemical linking between the polymer components, as for instance between the components (A) and (B) (so called phase coupling). The modification may also be caused by a chemical linking within the elastomeric copolymer (B) (so called elastomer cross-linking). Of course also the propylene polymer (A) can be effected by similar modifications. Chemical modification may be in principle obtained for instance when using thermally decomposing free radical-forming agents without any bifunctionally unsaturated compounds. However in such cases the polypropylene (A) is degraded, which is detrimental. Thus the modification in the present application is accomplished by the use of bifunctionally unsaturated monomer(s) (C') and/or multifunctionally unsaturated low molecular weight polymer(s) (C") as chemically bound bridging unit(s) (C).

"Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerised preferably with the aid of free radicals. The unsaturated sites in the bi- or multifunctionally unsaturated compounds are in their chemically bound state not actually "unsaturated", because the double bonds are each used for a covalent bond to the polymer chains of the polypropylene (A) and/or the elastomeric copolymer (B).

Reaction of the bifunctionally unsaturated monomer(s) (C') and/or multifunctionally unsaturated low molecular weight polymer(s) (C"), preferably having a number average molecular weight $(M_n) \leq 10000$ g/mol, synthesised from one and/or more unsaturated monomers with the propylene polymer composition may be performed in the presence of a thermally free radical forming agent, e.g. decomposing free radical-forming agent, like a thermally decomposable peroxide and/or ionising radiation or microwave radiation.

The bifunctionally unsaturated monomers (C') may be
divinyl compounds, such as divinylaniline, m-divinylbenzene, p-divinylbenzene, divinylpentane and divinylpropane;
allyl compounds, such as allyl acrylate, allyl methacrylate, allyl methyl maleate and allyl vinyl ether;
dienes, such as 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis(maleimide) bis(citraconimide) and mixtures of these unsaturated monomers.

Especially preferred bifunctionally unsaturated monomers (C') are 1,3-butadiene, isoprene, dimethyl butadiene and divinylbenzene.

The multifunctionally unsaturated low molecular weight polymer (C"), preferably having a number average molecular weight $(M_n) \leq 10000$ g/mol may be synthesized from one or more unsaturated monomers.

Examples of such low molecular weight polymers (C") are
polybutadienes, especially where the different microstructures in the polymer chain, i.e. 1,4-cis, 1,4-trans and 1,2-(vinyl) are predominantly in the 1,2-(vinyl) configuration
copolymers of butadiene and styrene having 1,2-(vinyl) in the polymer chain.

Preferred low molecular weight polymers (C"), more preferably low molecular weight polymers (C") having a number average molecular weight $(M_n) \leq 10000$ g/mol, are polybutadiene, in particular a polybutadiene having more than 50.0 wt.-% of the butadiene in the 1,2-(vinyl) configuration.

In the propylene polymer composition of the inventive cable layer the chemically bound bifunctionally unsaturated monomer(s) (C') and/or multifunctionally unsaturated low molecular weight polymer(s) (C") may act as coupling agent between the propylene polymer (A) and/or the elastomeric copolymer (B). It is believed that those molecules, which—with one of their functionalities—are bound to a polymer molecule of the propylene polymer (A) and—with their second or one of their further functionalities—are bound to a polymer molecule belonging to the disperse phase, effect the coupling action. Alternatively and preferably the bifunctionally or multifunctionally unsaturated compounds bound—with one of their functionalities—to a polymer molecule of the elastomeric copolymer (B), and—with their second or one of their further functionalities—bound to another polymer molecule belonging also to the elastomeric copolymer (B). It might of course also possible that the bifunctionally or multifunctionally unsaturated compounds modify in a similar manner propylene polymer (A).

The polypropylene composition of the inventive cable layer may contain more than one bifunctionally unsaturated monomer (C') and/or multifunctionally unsaturated low molecular weight polymer (C").

As stated above it is preferred that the bifunctionally unsaturated monomer(s) (C') and/or multifunctionally unsaturated low molecular weight polymer(s) (C") are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:
Acyl peroxides: benzoyl peroxide, 4-chlorobenzoyl peroxide, 3-methoxybenzoyl peroxide and/or methyl benzoyl peroxide;
Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide;
Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t- butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate;
or mixtures of these above listed free radical-forming agents;

Moreover, the propylene polymer composition of the inventive cable layer and/or the inventive cable layer shall preferably further featured by a rather a low melt flow rate (MFR). Thus it is appreciated that the propylene polymer composition according to this invention has an $MFR_2$ (230° C.) of not more than 5.00 g/10 min, preferably in a range of 0.05 to 4.00 g/10 min, more preferably of 0.30 to 2.00 g/10 min, still more preferably of 0.40 to 1.80 g/10 min.

It is a prejudice in literature that the melt flow rate (MFR) of polymers must be significantly increased for instance by degradation of the polymer chains to improve for instance process properties. According to standard procedures it is desired that the ratio between the melt flow rate of the propylene polymer composition after modification ($MFR_{final}$ measured according to ISO 1133 (230° C.)) and before modification ($MFR_{initial}$ measured according to ISO 1133 (230° C.)) is rather high, i.e. the $MFR_{final}/MFR_{initial}$ ratio is higher than 2.0. It has been now surprisingly found that also good process properties can be achieved without a high $MFR_{final}/MFR_{initial}$ ratio. Accordingly it is preferred that the $MFR_{final}/MFR_{initial}$ ratio of the propylene polymer composition is below 2.0 more preferably below 1.5.

A further characteristic of the inventive cable layer is that it can be produced at high line speeds, because the propylene polymer has rather good extensional melt flow properties.

The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as branching or linking, and as such can be far more descriptive with regard to polymer characterization than other types of bulk rheological measurement which apply shear flow.

Thus the propylene polymer of the inventive cable layer can be alternatively or additionally to the bifunctionally unsaturated monomers (C') and/or multifunctionally unsaturated low molecular weight polymers (C") further defined by its strain hardening behavior.

Accordingly it is preferred that the propylene polymer of the inventive cable layer, in particular due to the chemical modification, i.e. due to the use of bifunctionally unsaturated and/or multifunctionally unsaturated compounds, has a rather high strain hardening $SH_{3.0/2.5}$ (at a Hencky strain rate of 3 $s^{-1}$) of at least 0.5, more preferably of at least 0.7, yet more preferably of at least 0.8 and still more preferably of at least 0.9. The exact measuring method is defined in the example section.

Further the propylene polymer composition of the inventive cable layer and/or the inventive cable layer can be additionally defined by the gel content. The gel content is a good indicator for the chemical modification of the propylene polymer composition. Accordingly the present invention is preferably featured by a gel content of at least or more than 0.20 wt.-%, more preferably of at least or more than 0.23 wt.-%, still more preferably of at least or more than 0.25 wt.-%, yet more preferably of at least 0.27 wt.-%. On the other hand the gel content shall be not too high otherwise other properties are negatively influenced. Thus the gel content is preferably below or not more than 1.00 wt.-%, even more preferred not more than 0.80 wt.-%, still more preferred does not exceed 0.50 wt.-% determined as the relative amount of polymer insoluble in boiling xylene (xylene hot insoluble fraction, XHI). Thus a preferred range for the gel content is 0.20 to 0.90 wt.-%, like 0.25 to 0.90 wt.-%, more preferred 0.23 to 0.8 wt.-%, like 0.26 to 0.8 wt.-%.

Moreover the propylene polymer composition of the inventive cable layer has preferably a tensile modulus measured according to ISO 527-2 (cross head speed=50 mm/min) of at least 400 MPa and more preferably at least 450 MPa.

Additionally it is preferred that the propylene polymer composition of the inventive cable layer has a rather high impact strength. Accordingly the inventive polymer composition has an impact strength measured according to the Charpy impact test according to ISO 179 (1eA) at 23° C. of at least 60.0 $kJ/m^2$, more preferably of at least 70.0 $kJ/m^2$, yet more preferably of at least 80.0 $kJ/m^2$, and/or an impact strength measured according to the Charpy impact test according to ISO 179 (1eA) at −20° C. of at least 10.0 $kJ/m^2$, more preferably of at least 20.0 $kJ/m^2$.

For the propylene polymer composition of the inventive cable layer it is further appreciated that the strain at break measured according ISO 527-2 (cross head speed=50 mm/min) is at least 400%, more preferably at least more than 450%.

It should be additionally mentioned that the propylene polymer composition shall constitute the main part of the cable layer. Accordingly it is appreciated that the cable layer comprises at least 90 wt.-%, more preferably at least 95 wt.-% of the propylene polymer composition as defined in the instant invention. In a preferred embodiment the cable layer consists of the propylene polymer composition as defined in the instant invention.

The present invention is also directed of the use of the propylene polymer composition as a cable layer, i.e. as a coating layer of one or more conductors.

The present invention is additionally direct to the use of the cable layer as defined herein for cables, in particular for medium or high voltage cables.

Furthermore the present invention defines also cables comprising the cable layer according to the invention. Thus the invention is directed to cables comprising at least one conductor and one or more coating layer(s) wherein at least one coating layer is the cable layer as defined in the instant invention. Preferably such a cable comprises an insulation layer, a semicon and/or a jacketing layer as coating layers. Thus it is preferred that at least one of the insulation layer, the semicon and the jacketing layer is a cable layer of this invention. Even more preferred the insulation layer is a coating layer as defined in the instant invention. Such an insulation layer may comprise also carbon black.

For low voltage applications the cable system shall preferably either consist of one conductor and one insulation layer, or of one conductor, one insulation layer and an additional jacketing layer, or of one conductor, one semiconductive layer and one insulation layer. For medium and high voltage applications it shall preferably consist of one conductor, one inner semiconductive layer, one insulation layer and one outer semiconductive layer, optionally covered by an additionally jacketing layer. The semiconductive layers mentioned consist preferably of a thermoplastic polyolefin composition containing a sufficient amount of electrically conducting solid fillers preferably carbon black. At least one of the layers is the inventive cable layer mentioned above. It is preferred that the insulation layer is the inventive cable layer containing preferably solid fillers, more preferably carbon black.

Not only solid fillers can be incorporated into the insulation layer, but also any other additives suitable for insulation layers for cables.

Moreover, not only the insulation layer but also other layers can comprise the composition as defined above. Hence, the inventive cable layer constitutes also the semiconductive layer and/or the jacketing layer.

The final cable can also consist of multiple conductors or cores (normally 1, 2, 3 or 4) combined with single and common insulation layers.

In the following the manufacture of the inventive cable layer and the inventive cable, respectively, is described.

In general, the process for the manufacture of the cable layer and the cable, respectively, comprises the steps of
(a) mixing the propylene polymer (A) and the elastomeric copolymer (B),
(b) modifying said mixture by adding bifunctionally unsaturated monomers (C') and/or multifunctionally unsaturated low molecular weight polymers (C"), and
(c) extruding said mixture to a cable layer or extruding said mixture onto a conductor or conductors and subsequently solidifying (in a water bath) at line speeds of up to 400 m/min.

Accordingly, the cable layer or the cable in accordance with the present invention may be prepared by compounding the components within suitable melt mixing devices for preparing polymeric compounds, including in particular extruders single screw extruders as well as twin screw extruders. Especially preferred are twin screw extruders including high intensity mixing and kneading sections. Suitable melt temperatures for preparing the compositions are in the range from 170 to 270° C., preferably in the range from 200 to 250° C.

Preferably the polypropylene (A) and the elastomeric copolymer (B) are first produced to a so called heterophasic propylene copolymer (D).

In such a case the inventive cable layer and the inventive cable, respectively, are produced by the following steps:
(a) polymerizing propylene and optionally further comonomer(s) as defined above, preferably ethylene, in at least one reactor, preferably in one or more bulk reactor (s), preferably in a loop reactor, and optionally in one or more gas phase reactor (s), wherein the reactors are typically connected in series, to obtain the propylene polymer (A),
(b) transferring said propylene polymer (A) in a further reactor, preferably a gas phase reactor,
(c) producing the elastomeric copolymer (B) by polymerizing propylene and at least one comonomer selected from the group consisting of ethylene, C4 α-olefin, C5 α-olefin, C6 α-olefin, C7 α-olefin, C8 α-olefin, C9 α-olefin and C10 α-olefin, preferably ethylene, in the presence of said propylene polymer (A) to obtain the elastomeric copolymer (B) dispersed in said propylene polymer (A), i.e. leading to a heterophasic mixture,
(d) modifying the mixture of step (c), preferably due to bifunctionally unsaturated monomer(s) (C') and/or multifunctionally unsaturated low molecular weight polymer(s) (C"), optionally supported by thermally decomposing free radical-forming agents and
(e) extruding said mixture to a cable layer or extruding said mixture onto a conductor or conductors and subsequently solidifying (in a water bath) at line speeds of up to 400 m/min.

All reactors of steps (a) and (c) are preferably connected in series. The steps (d) and (e) are carried out in the mixing devices and temperature ranges as defined above.

The polymerisation is typically carried out in the presence of a Ziegler-Natta-type catalyst, as indicated above.

Thus, the Ziegler-Natta type catalyst typically used in the present invention is a propylene stereospecific, high yield Ziegler-Natta catalyst. Accordingly, a Ziegler Natta catalyst, e.g. an inorganic halide (e.g. $MgCl_2$) supported titanium catalyst, together with an aluminium alkyl (e.g. triethylaluminium) cocatalyst is employed. Silanes, e.g. dicyclopentanedimethoxysilane (DCPDMS) or cyclohexylmethyldimethoxysilane (CHMDMS), may be used as external donors. Such catalyst systems are described in EP 0 491 566 A1, the contents thereof are hereby incorporated by reference. The catalyst in the second polymerisation stage is typically the same that is used in the first polymerisation stage.

According to a preferred embodiment, the heterophasic propylene copolymer (D) is produced in a reactor system comprising at least one bulk reaction zone including at least one bulk reactor and at least one gas phase reaction zone including at least one gas phase reactor. The polymerization of propylene polymer (A), i.e. the matrix of the heterophasic propylene copolymer (D), is preferably carried out in a loop reactor and optionally in at least one gas phase reactor, i.e. in one or two gas phase reactor(s). The elastomeric copolymer (B) is subsequently produced in a gas phase reactor. However it is preferred that the propylene polymer (A) is produced in a loop reactor only and the elastomeric copolymer (B) is subsequently produced in a gas phase reactor in the presence of the propylene polymer (A).

Hydrogen can be used in different amounts as a molar mass modifier or regulator in any or every reactor in the first (polymerization of propylene polymer (A)) and second polymerization stage (polymerization of elastomeric copolymer (B)).

A separation stage can be employed between the reaction zones to prevent the carryover of reactants from the first polymerization stage into the second one.

In addition to the actual polymerization reactors used, the polymerization reaction system can also include a number of additional reactors, such as pre-reactors. The pre-reactors include any reactor for pre-activating and/or pre-polymerizing the catalyst with propylene and/or other α-olefin(s), like ethylene, if necessary. All reactors in the reactor system are preferably arranged in series.

The modification of the propylene polymer composition can be for instance effected by dosing the polymer components separately into a twin screw extruder like Prism TSE24 40D with preferably a temperature profile 80/200/210/220/220/230/230/220/225/220° C. and a screw speed of 300 rpm. After heating and melting of the polymer mixture, a solution of the thermally decomposing free radical-forming agent, like tert-butylperoxy isopropyl carbonate, preferably in acetone (10.0 wt.-%) is injected directly into the extruder, achieving a concentration of 0.1 to 3.0 wt.-% of the thermally decomposing free radical-forming agent, based on the mixture. Through a second injection port, the bifunctionally monomer(s) (D') and/or multifunctionally unsaturated low molecular weight polymer(s) (D"), like butadiene, is injected into the same zone of the extruder as the thermally decomposing free radical-forming agent has been added. The polymer melt/liquid/gas mixture is passed through the extruder, then to intensive devolatilisation, discharged and pelletised.

Usual amounts of auxiliary substances, which may range from 0.01 to 2.5 wt.-% of stabilizers, 0.01 to 1 wt.-% of processing aids, 0.1 to 1 wt.-% of antistats, 0.2 to 3 wt.-% of pigments and up to 3 wt.-% of α-nucleating agents, in each case based on the sum of the propylene polymer composition, may be added.

The final propylene polymer composition (preferably in pellet form) is then used to form a cable layer by passing it through an extruder onto a conductor or conductors and subsequently solidifying it (in a water bath) at line speeds of up to 400 m/min.

Considering the information given above especially preferred embodiments are as follow:

[Paragraph 1] Cable layer comprising a propylene polymer composition comprising
(a) a propylene polymer (A)
(b) an elastomeric copolymer (B) of propylene and at least one comonomer selected from the group consisting of ethylene, C4 α-olefin, C5 α-olefin, C6 α-olefin, C7 α-olefin, C8 α-olefin, C9 α-olefin and C10 α-olefin, and
(c) units (C) derived from at least bifunctionally unsaturated monomer(s) (C') and/or at least multifunctionally unsaturated low molecular weight polymer(s) (C").

[Paragraph 2] Cable layer according to [Paragraph 1], wherein the propylene polymer composition has an $MFR_2$ (230° C.) measured according to ISO 1133 of not more than 5.00 g/10 min.

[Paragraph 3] Cable layer according to [Paragraph 1] or [Paragraph 2], wherein the ratio of $MFR_{final}/MFR_{initial}$ is below 2.0 wherein
(a) the $MFR_{final}$ is the MFR (230° C.) measured according to ISO 1133 of the propylene polymer composition, and
(b) the $MFR_{initial}$ is the MFR (230° C.) measured according to ISO 1133 of the mixture of the propylene polymer (A) and the elastomeric copolymer (B).

[Paragraph 4] Cable layer according to any one of the preceding paragraphs [Paragraph 1] to [Paragraph 3], wherein the propylene polymer (A) and the elastomeric copolymer (B) are a reactor blend.

[Paragraph 5] Cable layer according to any one of the preceding paragraphs [Paragraph 1] to [Paragraph 4], wherein the propylene polymer (A) is the matrix of a heterophasic propylene copolymer (D) and the elastomeric copolymer (B) is an amorphous part of said heterophasic propylene copolymer (D).

[Paragraph 6] Cable layer according to any one of the preceding paragraphs [Paragraph 1] to [Paragraph 5], wherein propylene polymer (A), the elastomeric copolymer (B) and optionally the multifunctionally unsaturated low molecular weight polymers (C") are the only polymers within the propylene polymer composition.

[Paragraph 7] Cable layer according to any one of the preceding paragraphs [Paragraph 1] to [Paragraph 6], wherein the propylene polymer composition has a strain hardening $SH_{3.0/2.5}$ (at a Hencky strain rate of 3 $s^{-1}$) of at least 0.5.

[Paragraph 8] Cable layer according to any one of the preceding paragraphs [Paragraph 1] to [Paragraph 7], wherein the propylene polymer (A) is propylene copolymer (A") of propylene and at least one comonomer selected from the group consisting of ethylene, C4 α-olefin, C5 α-olefin. C6 α-olefin, C7 α-olefin, C8 α-olefin, C9 α-olefin and C10 α-olefin.

[Paragraph 9] Cable layer according to [Paragraph 8], wherein comonomer content of the propylene copolymer (A") is not more than 9.0 wt.-%.

[Paragraph 10] Cable layer according to [Paragraph 8] or [Paragraph 9], wherein the comonomer is ethylene.

[Paragraph 11] Cable layer according to any one of the preceding paragraphs [Paragraph 8] to [Paragraph 10], wherein the propylene polymer (A) being a propylene copolymer (A") is unimodal.

[Paragraph 12] Cable layer according to any one of the preceding paragraphs [Paragraph 1] to [Paragraph 11], wherein comonomer content of the elastomeric copolymer (B) is at least 15.0 wt.-%.

[Paragraph 13] Cable layer according to any one of the preceding paragraphs [Paragraph 1] to [Paragraph 12], wherein the intrinsic viscosity of the elastomeric copolymer (B), determined as the intrinsic viscosity of the acetone precipitated fraction of the xylene soluble fraction, IV of AM, is equal or below 4.0 dl/g.

[Paragraph 14] Cable layer according to any one of the preceding paragraphs [Paragraph 1] to [Paragraph 13], wherein the elastomeric copolymer (B) is an ethylene propylene rubber (EPR).

[Paragraph 15] Cable layer according to any one of the preceding paragraphs [Paragraph 1] to [Paragraph 15], wherein the comonomer content of the propylene polymer composition, preferably the comonomer content of the propylene polymer (A) and the elastomeric copolymer (B) together, is at least 7.0 wt.-%.

[Paragraph 16] Cable layer according to any one of the preceding paragraphs [Paragraph 1] to [Paragraph 15], wherein the propylene polymer composition comprises
(a) at least 40.0 wt.-% of propylene polymer (A)
(b) at least 20.0 wt.-% of the elastomeric (B) based on the propylene polymer composition

[Paragraph 17] Cable layer according to any one of the preceding paragraphs [Paragraph 1] to [Paragraph 16], wherein the propylene polymer composition comprises at least 0.1 wt.-% of bifunctionally unsaturated monomers (C') and/or multifunctionally unsaturated low molecular weight polymers (C") based on the propylene polymer composition.

[Paragraph 18] Cable layer according to any one of the preceding paragraphs [Paragraph 1] to [Paragraph 17], wherein the bifunctionally unsaturated monomers (C') used for the units (C) are selected from the group consisting of divinyl compounds, allyl compounds and dienes.

[Paragraph 19] Cable layer according to any one of the preceding paragraphs [Paragraph 1] to [Paragraph 18], wherein the bifunctionally unsaturated monomers (C') used for the units (C) are selected from the group consisting of 1,3-butadiene, isoprene, dimethylbutadiene, and divinylbenzene.

[Paragraph 20] Cable layer according to any one of the preceding paragraphs [Paragraph 1] to [Paragraph 19], wherein the multifunctionally unsaturated low molecular weight polymer (C") has a number average molecular weight (Mn) of equal or below 10000 g/mol.

[Paragraph 21] Cable layer according to [Paragraph 20], wherein the multifunctionally unsaturated low molecular weight polymer (C") is a polybutadiene.

[Paragraph 22] Cable layer according to any one of the preceding paragraphs [Paragraph 1] to [Paragraph 21], wherein the layer comprises at least 90 wt.-% of the propylene polymer composition as defined in any one of the preceding paragraphs [Paragraph 1] to [Paragraph 21].

[Paragraph 23] Use of a propylene polymer composition as defined in any one of the preceding paragraphs [Paragraph 1] to [Paragraph 22] as a cable layer.

[Paragraph 24] Use of a cable layer according to any one of the preceding paragraphs [Paragraph 1] to [Paragraph 22] for cables.

[Paragraph 25] Use according to paragraphs [Paragraph 23] to [Paragraph 24] for medium or high voltage cables.

[Paragraph 26] Cable comprising at least one conductor and one or more coating layer(s) wherein at least one coating layer is the cable layer according to any one of the preceding paragraphs [Paragraph 1] to [Paragraph 22].

[Paragraph 27] Cable according to s [Paragraph 26], wherein the cable comprises an insulation layer, a semicon and/or a jacketing layer as coating layers.

[Paragraph 28] Cable according to [Paragraph 26] or [Paragraph 27], wherein the cable layer of any one of the preceding paragraphs [Paragraph 1] to [Paragraph 22] constitutes an insulation layer, a semicon and/or a jacketing layer.

[Paragraph 29] Cable according to any one of the paragraphs [Paragraph 26] to [Paragraph 28], wherein the insulation layer comprises carbon black.

[Paragraph 30] Process for the manufacture of a cable layer according to any one of the preceding paragraphs [Paragraph 1] to [Paragraph 22] comprising the steps
(a) mixing the propylene polymer (A) and the elastomeric copolymer (B),
(b) adding bifunctionally unsaturated monomers (C') and/or multifunctionally unsaturated low molecular weight polymers (C"), and
(c) extruding said mixture to a cable layer.

[Paragraph 31] Process according to [Paragraph 30], wherein first a heterophasic mixture of propylene polymer (A) and elastomeric copolymer (B) is produced by comprising the steps
(a) polymerizing propylene and optionally further comonomer(s) in at least one reactor, preferably a loop reactor followed by a gas phase reactor, to obtain the propylene polymer (A),
(b) transferring said propylene polymer (A) in a further reactor(s), preferably a gas phase reactor,
(c) producing elastomeric copolymer (B) by polymerizing propylene and at least one comonomer selected from the group consisting of ethylene, C4 α-olefin, C5 α-olefin, C6 α-olefin, C7 α-olefin, C8 α-olefin, C9 α-olefin and C10 α-olefin, in the presence said propylene polymer (A) to obtain the heterophasic mixture,

[Paragraph 32] Process for producing a cable according to any one of the preceding paragraphs [Paragraph 26] to [Paragraph 28] comprising the steps
(a) mixing the propylene polymer (A) and the elastomeric copolymer (B),
(b) adding bifunctionally unsaturated monomers (C') and/or multifunctionally unsaturated low molecular weight polymers (C"),
(c) extruding said mixture onto a conductor or conductors and subsequently solidifying at line speeds of up to 400 m/min.

[Paragraph 33] Process according to [Paragraph 32], wherein the solidification takes place in a water bath.

[Paragraph 34] Process according to [Paragraph 32] or [Paragraph 33], wherein first a heterophasic mixture of propylene polymer (A) and elastomeric copolymer (B) is produced by comprising the steps
(a) polymerizing propylene and optionally further comonomer(s) in at least one reactor, preferably a loop reactor followed by a gas phase reactor, to obtain the propylene polymer (A),
(b) transferring said propylene polymer (A) in a further reactor(s), preferably a gas phase reactor,
(c) producing elastomeric copolymer (B) by polymerizing propylene and at least one comonomer selected from the group consisting of ethylene, C4 α-olefin, C5 α-olefin, C6 α-olefin, C7 α-olefin, C8 α-olefin, C9 α-olefin and C10 α-olefin, in the presence said propylene polymer (A) to obtain the heterophasic mixture.

The present invention will now be described in further detail by the examples provided below.

EXAMPLES

1. Definitions/Measuring Methods

The following definitions of terms and determination methods apply for the above general description of the invention as well as to the below examples unless otherwise defined.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

$MFR_2$ (230° C.) is measured according to ISO 1133 (230° C., 2.16 kg load).

$MFR_2$ (190° C.) is measured according to ISO 1133 (190° C., 2.16 kg load).

Ethylene content, in particular of the matrix, i.e. polypropylene (A), is measured with Fourier transform infrared spectroscopy (FTIR) calibrated with $^{13}$C-NMR. When measuring the ethylene content in polypropylene, a thin film of the sample (thickness about 250 µm) was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR.

Content of any one of the C4 to C20 α-olefins are calculated using integral ratios taken from the processed spectrum using the assignments described in: J C. Randall, J M S- Rev. Macromol. Chem. Phys., C29 (2&3), 201-317 (1989)

Intrinsic viscosity is determined according to DIN ISO 1628/1, October 1999 (in Decalin at 135° C.).

Tensile Modulus is determined according to ISO 527-½ (23° C.) using injection molded specimens as described in EN ISO 294-1 (multi-purpose test specimen as described in ISO 527-2).

Strain at break is determined according to ISO 527-½ (23° C.) using injection molded specimens as described in EN ISO 294-1 (multi-purpose test specimen as described in ISO 527-2).

Tensile Strength is determined according to ISO 527-2 (23° C.) using injection molded specimens as described in EN ISO 294-1 (multi-purpose test specimen as described in ISO 527-2).

Flexural modulus is determined according to ISO178 (23° C.). The flexural modulus is measured on samples prepared from injection molded specimens as described in EN ISO 294-1 (test specimen 80×10×4 mm as described in ISO 178)

Charpy impact test: The charpy notched impact strength (Charpy NIS) is measured according to ISO179 1eA at 23° C. and −20° C., respectively, using injection molded specimen according to EN ISO 294-1 (test specimen 80×10×4 mm as described in ISO 179).

The xylene solubles (XS, wt.-%): Content of xylene solubles (XS) is determined at 23° C. according ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Amorphous rubber fraction of the xylene solubles (AM)—Determination of AM The solution from the 100 ml flask in the xylene solubles analysis is treated with 200 ml of acetone under vigorous stirring. The precipitate is filtered and dried in a vacuum oven at 90° C.

AM %=(100×$m_2$×$v_o$)/($m_o$×$v_1$)
$m_o$=initial polymer amount (g)
$m_2$=weight of precipitate (g)
$v_o$=initial volume (ml)
$v_1$=volume of analyzed sample (ml)

Strain hardening behaviour (melt strength):
To characterize the extent of strain hardening of the polymer compositions in the present invention, the rheological properties of the treated and untreated polymers were tested on a standard Physica instrument in combination with a SER-Extensional Rheology System. The measurements were performed at 180° C. and at different Hencky strain rates. The method is described in details in M. Sentmanat et al, "Measuring the transient extensional rheology of polyethylene melts using the SER universal testing platform", J. Rheol. 49 (2005), 585-606. In the present invention, following procedure is applied for carrying out the SER-Extensional experiments:

Experimental Setup

A Paar Physica MCR300, equipped with a TC30 temperature control unit and an oven CTT600 (convection and radiation heating) and a SERVP01-025 extensional device with temperature sensor and a software RHEOPLUS/32 v2.66 is used.

Sample Preparation

Stabilized pellets are compression moulded at 220° C. (gel time 3 min, pressure time 3 min, total moulding time 3+3=6 min) in a mould at a pressure sufficient to avoid bubbles in the specimen, cooled to room temperature and cut to stripes of 0.7 mm thickness to a plate from which stripes of a width of 10 mm and a length of 18 mm are cut.

Check of the SER Device

Because of the low forces acting on samples stretched to thin thicknesses, any essential friction of the device would deteriorate the precision of the results and has to be avoided.

In order to make sure that the friction of the device less than a threshold of $5 \times 10^{-3}$ mNm (Milli-Newtonmeter) which is required for precise and correct measurements, following check procedure is performed prior to each measurement:

The device is set to test temperature (180° C.) for minimum 30 minutes without sample in presence of the clamps A standard test with $0.3 s^{-1}$ is performed with the device on test temperature (180° C.)

The torque (measured in mNm) is recorded and plotted against time

The torque must not exceed a value of $5 \times 10^{-3}$ mNm to make sure that the friction of the device is in an acceptably low range Conducting the Experiment The device is heated for min. 20 min to the test temperature (180° C. measured with the thermocouple attached to the SER device) with clamps but without sample. Subsequently, the sample (0.7×10×18 mm), prepared as described above, is clamped into the hot device. The sample is allowed to melt for 2 minutes before the experiment is started.

During the stretching experiment under inert atmosphere (nitrogen) at constant Hencky strain rate, the torque is recorded as function of time at isothermal conditions (measured and controlled with the thermocouple attached to the SER device).

After stretching, the device is opened and the stretched film (which is winded on the drums) is inspected. Homogenous extension is required. It can be judged visually from the shape of the stretched film on the drums if the sample stretching has been homogenous or not. The tape must be wound up symmetrically on both drums, but also symmetrically in the upper and lower half of the specimen.

If symmetrical stretching is confirmed, the transient elongational viscosity is calculated from the recorded torque as described in M. Sentmanat et al, "Measuring the transient extensional rheology of polyethylene melts using the SER universal testing platform", J. Rheol. 49 (2005), 585-606.

For the evaluation of the strain hardening, the value $SH_{3.0/2.5}$ is calculated as follow: $SH_{3.0/2.5}=(\log(\eta^e_{3.0})-\log(\eta^e_{2.5}))/(\log(3.0)-\log(2.5))$ where log is Brigg's logarithm, and $\theta^e_{3.0}$ and $\eta^e_{2.5}$ are the elongation viscosities at 3.0 and 2.5% strain respectively. The higher the $SH_{3.0/2.5}$ the higher the strain hardening.

Heat Deformation Test (HPT)

The HPT is a modified test of EN 60811-3-1 with regard to temperatures, weights and times. In order to simulate the real cases the following test conditions are selected.

135° C. for 4 hours

250° C. for 1 minute

Three samples of each material are placed in an oven (135° C./4 hour). A knife with a load of 1447 g is placed on each of the samples (compare FIG. 4). The samples are immediately cooled down after the end of the test and deformation of the sample is measured. The test rig is put in the oven before the testing started so the metal rig has the same temperature as the oven when the samples are put in.

The samples are 10×10×20 mm. The rod in the test rig simulating the cable conductor is taken out of EN 60811-3-1

In order to simulate better the deformation stability at 250° C. the specimen is put on the smallest side (10×10) and the 20 in the vertical direction. Then the samples are let standing in the oven for 10 min without a load and the deformation as percentage of original length (20 mm) is recorded.

Hot Wire Deformation Test (HWT)

This test is performed to demonstrate the resistance of a cable material to short heat load situations similar to the short circuit test of standard in IEC811-3-1. Instead of using a complete insulated cable as in said test, a copper conductor with 1.5 mm$^2$ cross section area and 210 mm length (1) is used in combination with a compression moulded plate of the insulation material (2). The conductor is mounted in between two supports and connected to a direct current (DC) welding generator (4) (see FIG. 5), all kept initially at ambient temperature (+23° C.). When a current of 75 A is applied, the temperature on the conductor increases 60° C. every 10 sec during the first minute of the test, verified by measuring the temperature with a thermocouple (5) attached to the conductor.

The insulation material (polymer) is compression moulded into a plate of 1.25 mm thickness, from which square specimen of 20×20 mm are cut and placed between the conductor and the same knife setup (6) as in IEC811-3-1, which knife setup is loaded with 121 g (3), calculated from the thickness of insulation in IEC811-3-1. The angle between knife blade and conductor is set to 90°. To register when the knife gets in contact with the conductor, a control circuit (7) between the conductor and the knife is set up to indicate this contact with a beep signal.

For performing the actual test, the DC welding generator is started simultaneously with a timer of a precision better than 1 second. Both time and temperature of the beep signal, i.e. the penetration of the knife through the insulation material, are noted. To improve the precision, five repetitions of the test are performed for each type of material and an arithmetical average for both time and temperature is calculated.

In practice, two main averages over the Heat shock test according to IEC811-3-1 have been identified, namely the fact that it is a more realistic test for cable applications since heat is generated at the conductor in contact with the testing probe and that the failure of insulation is identified via a realistic temperature ramp.

Preparation of the Examples

The propylene polymer composition CE 1 (heterophasic propylene copolymer (D)) was produced in a multistage polymerization process consisting of a loop reactor and a gas phase reactor using a conventional Ziegler Natta catalyst system as known in the art. In the loop reactor, a propylene random copolymer with an ethylene content of 4.0 wt.-% and MFR of 0.9 g/10 min was produced. The polymer was transferred to the gas phase reactor, where the elastomeric ethylene-propylene-copolymer was synthesized. The final composition had an MFR value of 0.5 g/10 min, a XS value of 27.5 wt.-% and the intrinsic viscosity of the xylene soluble part was 2.5 dl/g. The ethylene content of the xylene soluble part was 42 wt.-%. The total ethylene content in the entire composition was 15.5 wt.-%.

The preparation of examples E1 and E2 is carried out by mixing of the components as indicated in table 2 using the twin screw extruder and processing parameters described on page 25. The composition and properties of the examples and comparative example are summarized in Table 1 to 4. 1,3-butadiene was used as bifunctionally unsaturated monomer and t-butyl peroxy isopropyl carbonate was used as free radical-forming agent.

TABLE 1

Properties of CE 1 (heterophasic propylene copolymer)

|  | Unit | Matrix | Final Product |
|---|---|---|---|
| MFR | [g/10 min] | 0.9 | 0.5 |
| xylene solubles | [wt.-%] | 4.2 | 27.5 |
| C2 | [wt.-%] | 4.0 | 15.5 |
| IV/AM | [dl/g] | — | 2.5 |

TABLE 2

Modification of the heterophasic propylene copolymer

|  | Unit | CE 1 | E 1 | E 2 |
|---|---|---|---|---|
| CE 1 | [wt-%] | 100 | 99.75 | 99.40 |
| free radical-forming agent | [wt-%] | — | 0.15 | 0.30 |
| bifunctionally unsaturated monomer | [wt-%] | — | 0.10 | 0.30 |
| MFR Value | [g/10 min] | 0.5 | 0.7 | 0.9 |
| Gel content | [wt-%] | 0.00 | 0.31 | 0.53 |
| Xylene solubles (XS) | [wt-%] | 0.35 | 0.18 | 0.53 |
| Tensile Modulus | [MPa] | 543 | 486 | 471 |
| Tensile Strength | [MPa] | 22 | 23.3 | 24.1 |
| Strain at break | [%] | 459 | 568 | 586 |
| Impact strength at RT | [kJ/m$^2$] | 83.3 | 87.8 | 81.4 |
| Impact strength at 0° C. | [kJ/m$^2$] | 41.9 | 80.1 | 72 |
| Impact strength at −20° C. | [kJ/m$^2$] | 6.1 | 24.5 | 12.6 |
| SH$_{3.0/2.5}$ at Hencky strain rate of 10 s$^{-1}$ |  | break | 0.76 | 1.80 |
| SH$_{3.0/2.5}$ at Hencky strain rate of 3 s$^{-1}$ |  | break | 0.73 | 1.28 |
| SH$_{3.0/2.5}$ at Hencky strain rate of 1 s$^{-1}$ |  | 0.30 | break | 1.61 |
| SH$_{3.0/2.5}$ at Hencky strain rate of 0.3 s$^{-1}$ |  | 0.42 | 0.47 | 0.97 |

TABLE 3

HPT-measurements

|  | 135° C., 4 h, 1.5 kg load | 250° C., 10 min |
|---|---|---|
| E 1 | 3% | 6% |
| CE 1 | 3% | 17% |

The indentation at 250° C. of CE 1 is not very promising. In contrast, the E 1 shows very good results both at 135° C. and at 250° C. (Table 3).

TABLE 4

HWT-measurements

|  | temperature at contact | time to contact |
|---|---|---|
| E 1 | 173.6° C. (±14.7) | 31.2 s (±3.4) |
| CE 1 | 154.6° C. (±9.3) | 28.4 s (±1.1) |

The E 1 shows clear advantages both in terms of higher temperature at contact and longer time to contact compared to the CE 1.

We claim:

1. Cable layer comprising a propylene polymer composition comprising
   (a) a propylene polymer (A)
   (b) an elastomeric copolymer (B) of propylene and at least one comonomer selected from the group consisting of ethylene, C4 α-olefin, C5 α-olefin, C6 α-olefin, C7 α-olefin, C8 α-olefin, C9 α-olefin and C10 α-olefin, and
   (c) units (C) derived from at least bifunctionally unsaturated monomer(s) (C') and/or at least multifunctionally unsaturated low molecular weight polymer(s) (C"), the units (C) being linked to the propylene polymer (A) and the elastomeric copolymer (B), the units (C) are chemically bound bridging units,
   wherein the gel content of the propylene polymer composition determined as the amount of polymer insoluble in boiling xylene is not more than 1 wt.-%.

2. Cable layer according to claim 1, wherein the propylene polymer composition comprises
   (a) a propylene polymer (A)
   (b) an elastomeric copolymer (B) of propylene and at least one comonomer selected from the group consisting of ethylene, C4 α-olefin, C5 α-olefin, C6 α-olefin, C7 α-olefin, C8 α-olefin, C9 α-olefin and C10 α-olefin, and
   (c) units (C) derived from at least bifunctionally unsaturated monomer(s) (C') and/or at least multifunctionally unsaturated low molecular weight polymer(s) (C"), the units (C) are chemically bound bridging units being linked to the propylene polymer (A) and/or the elastomeric copolymer (B)
   wherein further
   "bifunctionally unsaturated" or "multifunctionally unsaturated" means two or more non-aromatic double bounds,
   the multifunctionally unsaturated low molecular weight polymer(s) (C") has (have) a number average molecular weight (Mn)≦10,000 g/mol, and
   the gel content of the propylene polymer composition determined as the amount of polymer insoluble in boiling xylene is not more than 1 wt %.

3. Cable layer according to claim 1, wherein the propylene polymer composition has an MFR$_2$ (230° C.) measured according to ISO 1133 of not more than 5.00 g/10min.

4. Cable layer according to claim 1, wherein the ratio of MFR$_{final}$/MFR$_{initial}$ is below 2.0 wherein
   (a) the MFR$_{final}$ is the MFR (230° C.) measured according to ISO 1133 of the propylene polymer composition, and
   (b) the MFR$_{initial}$ is the MFR (230° C.) measured according to ISO 1133 of the mixture of the propylene polymer (A) and the elastomeric copolymer (B).

5. Cable layer according to claim 1, wherein the propylene polymer (A) and the elastomeric copolymer (B) are a reactor blend.

6. Cable layer according to claim 1, wherein the propylene polymer (A) is the matrix of a heterophasic propylene copolymer (D) and the elastomeric copolymer (B) is an amorphous part of said heterophasic propylene copolymer (D).

7. Cable layer according to claim 1, wherein propylene polymer (A), the elastomeric copolymer (B) and optionally the multifunctionally unsaturated low molecular weight polymers (C") are the only polymers within the propylene polymer composition.

8. Cable layer according claim 1, wherein the propylene polymer composition has a strain hardening $SH_{3.0/2.5}$ (at a Hencky strain rate of 3 s$^{-1}$) of at least 0.5.

9. Cable layer according to claim 1, wherein the propylene polymer (A) is propylene copolymer (A") of propylene and at least one comonomer selected from the group consisting of ethylene, C4 α-olefin, C5 α-olefin. C6 α-olefin, C7 α-olefin, C8 α-olefin, C9 α-olefin and C10 α-olefin.

10. Cable layer according to claim 9, wherein comonomer content of the propylene copolymer (A") is not more than 9.0 wt.-%.

11. Cable layer according to claim 9, wherein the comonomer is ethylene.

12. Cable layer according to claim 9, wherein the propylene polymer (A) being a propylene copolymer (A") is unimodal.

13. Cable layer according to claim 1, wherein comonomer content of the elastomeric copolymer (B) is at least 15.0 wt.-%.

14. Cable layer according to claim 1, wherein the intrinsic viscosity of the elastomeric copolymer (B), determined according to DIN ISO 1628/1 as the intrinsic viscosity of the acetone precipitated fraction of the xylene soluble fraction, IV of AM, is equal or below 4.0 dl/g.

15. Cable layer according to claim 1, wherein the elastomeric copolymer (B) is an ethylene propylene rubber (EPR).

16. Cable layer according to claim 1, wherein the comonomer content of the propylene polymer composition, preferably the comonomer content of the propylene polymer (A) and the elastomeric copolymer (B) together, is at least 7.0 wt.-%.

17. Cable layer according to claim 1, wherein the propylene polymer composition comprises
  (a) at least 40.0 wt.-% of propylene polymer (A)
  (b) at least 20.0 wt.-% of the elastomeric (B) based on the propylene polymer composition.

18. Cable layer according to claim 1, wherein the propylene polymer composition comprises at least 0.1 wt.-% of bifunctionally unsaturated monomers (C') and/or multifunctionally unsaturated low molecular weight polymers (C") based on the propylene polymer composition.

19. Cable layer according to claim 1, wherein the bifunctionally unsaturated monomers (C') used for the units (C) are selected from the group consisting of divinyl compounds, allyl compounds and dienes.

20. Cable layer according to claim 1, wherein the bifunctionally unsaturated monomers (C') used for the units (C) are selected from the group consisting of 1,3-butadiene, isoprene, dimethylbutadiene, and divinylbenzene.

21. Cable layer according to claim 1, wherein the multifunctionally unsaturated low molecular weight polymer (C") has a number average molecular weight (Mn) of equal or below 10000 g/mol.

22. Cable layer according to claim 21, wherein the multifunctionally unsaturated low molecular weight polymer (C") is a polybutadiene.

23. Cable layer according to claim 1, wherein the layer comprises at least 90 wt.-% of the propylene polymer composition.

24. Use of a propylene polymer composition according to claim 1 as a cable layer.

25. Use of the cable layer according to claim 1 for cables.

26. Use according to claim 25 for medium or high voltage cables.

27. Cable comprising at least one conductor and one or more coating layer(s) wherein at least one coating layer is a cable layer comprising a propylene polymer composition comprising
  (a) a propylene polymer (A)
  (b) an elastomeric copolymer (B) of propylene and at least one comonomer selected from the group consisting of ethylene, C4 α-olefin, C5 α-olefin, C6 α-olefin, C7 α-olefin, C8 α-olefin, C9 α-olefin and C10 α-olefin, and
  (c) units (C) derived from at least bifunctionally unsaturated monomer(s) (C') and/or at least multifunctionally unsaturated low molecular weight polymer(s) (C"), the units (C) being linked to the propylene polymer (A) and the elastomeric copolymer (B), the units (C) are chemically bound bridging units,
  wherein the gel content of the propylene polymer composition determined as the amount of polymer insoluble in boiling xylene is not more than 1 wt.-%.

28. Cable according to claim 27, wherein the cable comprises an insulation layer, a semicon and/or a jacketing layer as coating layers.

29. Cable according to claim 27, wherein the cable layer is an insulation layer, a semicon and/or a jacketing layer.

30. Cable according to claim 28, wherein the insulation layer comprises carbon black.

31. Process for producing a cable according to claim 27 comprising the steps
  (a) mixing the propylene polymer (A) and the elastomeric copolymer (B),
  (b) adding bifunctionally unsaturated monomers (C') and/or multifunctionally unsaturated low molecular weight polymers (C"),
  (c) extruding said mixture onto a conductor or conductors and subsequently solidifying at line speeds of up to 400 m/min.

32. Process according to claim 31, wherein the solidification takes place in a water bath.

33. Process according to claim 31, wherein first a heterophasic mixture of propylene polymer (A) and elastomeric copolymer (B) is produced by comprising the steps
  (a) polymerizing propylene and optionally further comonomer(s) in at least one reactor, preferably a loop reactor followed by a gas phase reactor, to obtain the propylene polymer (A),
  (b) transferring said propylene polymer (A) in a further reactor(s), preferably a gas phase reactor,
  (c) producing elastomeric copolymer (B) by polymerizing propylene and at least one comonomer selected from the group consisting of ethylene, C4 α-olefin, C5 α-olefin, C6 α-olefin, C7 α-olefin, C8 α-olefin, C9 α-olefin and C10 α-olefin, in the presence said propylene polymer (A) to obtain the heterophasic mixture.

34. Process for the manufacture of a cable layer comprising the steps
  providing a propylene polymer (A),
  providing an elastomeric copolymer (B),
  providing a bifunctionally unsaturated monomers (C') and/or multifunctionally unsaturated low molecular weight polymers (C"),
  (a) mixing the propylene polymer (A) and the elastomeric copolymer (B), (b) adding bifunctionally unsaturated monomers (C') and/or multifunctionally unsaturated low molecular weight polymers (C"), and deriving units (C) being linked to the propylene polymer (A) and the elastomeric copolymer (B), the units (C) are chemically bound bridging units, and
(c) extruding said mixture to a cable layer.

35. Process according to claim 34, wherein first a heterophasic mixture of propylene polymer (A) and elastomeric copolymer (B) is produced by comprising the steps
   (a) polymerizing propylene and optionally further comonomer(s) in at least one reactor to obtain the propylene polymer (A),
   (b) transferring said propylene polymer (A) in a further reactor(s),
   (c) producing elastomeric copolymer (B) by polymerizing propylene and at least one comonomer selected from the group consisting of ethylene, C4 α-olefin, C5 α-olefin, C6 α-olefin, C7 α-olefin, C8 α-olefin, C9 α-olefin and C10 α-olefin, in the presence said propylene polymer (A) to obtain the heterophasic mixture.

* * * * *

UNITED STATES PATENT AND TRADEMARK OFFICE
CERTIFICATE OF CORRECTION

PATENT NO. : 8,487,185 B2  
APPLICATION NO. : 12/735155  
DATED : July 16, 2013  
INVENTOR(S) : Machl et al.

Page 1 of 1

It is certified that error appears in the above-identified patent and that said Letters Patent is hereby corrected as shown below:

In the Specification

Column 16,
Line 63, delete "s" before -- [Paragraph 26] --.

Column 17,
Line 28, insert -- of -- after -- presence --.

Column 20,
Line 1, "$\theta^e_{3,0}$" should be -- $\eta^e_{3,0}$ --.

In the Claims

Column 24,
Line 54, "andat" should be -- and at --.

Column 24,
Line 57, insert -- of -- after -- presence --.

Column 25,
Line 20, insert -- of -- after -- presence --.

Signed and Sealed this  
First Day of July, 2014

Michelle K. Lee  
*Deputy Director of the United States Patent and Trademark Office*